(12) United States Patent
Jin

(10) Patent No.: US 10,782,024 B2
(45) Date of Patent: Sep. 22, 2020

(54) COMBUSTION DUCT ASSEMBLY FOR GAS TURBINE

(71) Applicant: DOOSAN HEAVY INDUSTRIES & CONSTRUCTION CO., LTD., Gyeongsangnam-do (KR)

(72) Inventor: Heon Seop Jin, Seoul (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 388 days.

(21) Appl. No.: 15/179,445

(22) Filed: Jun. 10, 2016

(65) Prior Publication Data
US 2016/0370009 A1 Dec. 22, 2016

(30) Foreign Application Priority Data

Jun. 16, 2015 (KR) .................. 10-2015-0085057

(51) Int. Cl.
*F23R 3/00* (2006.01)
*F23R 3/08* (2006.01)
(Continued)

(52) U.S. Cl.
CPC .............. *F23R 3/002* (2013.01); *F01D 9/023* (2013.01); *F02C 7/18* (2013.01); *F02C 7/28* (2013.01);
(Continued)

(58) Field of Classification Search
CPC ...... F02C 7/18; F02C 7/28; F23R 3/02; F23R 3/002; F23R 3/08; F23R 3/16; F23R 3/42;
(Continued)

(56) References Cited

U.S. PATENT DOCUMENTS 3,995,422 A * 12/1976 Stamm ............... F23R 3/08 60/757
7,926,283 B2 * 4/2011 Byrne ............... F23R 3/06 60/752
(Continued)

FOREIGN PATENT DOCUMENTS

JP 2008135968 A 5/1996
JP 2008270947 A 10/1996
(Continued)

OTHER PUBLICATIONS

Korean Office Action issued by the Korean Intellectual Property Office dated Aug. 3, 2017 in connection with Korean patent application No. 10-2015-0085057.
(Continued)

*Primary Examiner* — Ehud Gartenberg
*Assistant Examiner* — Jacek Lisowski
(74) *Attorney, Agent, or Firm* — Invenstone Patent, LLC

(57) ABSTRACT

A combustion duct assembly for a gas turbine includes a liner, an annular spring seal and a transition piece. The annular spring seal is outwardly convex and coupled to an outer face of the downstream side of the liner. The transition piece has includes an inner wall and an outer wall that surrounds the inner wall. The convex part of annular spring seal is operable to elastically engage the inner wall of the transition piece. An end portion of the downstream side of the annular spring seal is fixed to the line. The annular spring seal includes a plurality of through holes formed in an upstream side of a point where the annular spring seal comes into contact with the inner wall. The liner includes a plurality of vent holes formed in an inner area surrounded by the spring seal.

18 Claims, 2 Drawing Sheets

(51) Int. Cl.
*F01D 9/02* (2006.01)
*F02C 7/18* (2006.01)
*F02C 7/28* (2006.01)
*F23R 3/42* (2006.01)

(52) U.S. Cl.
CPC .................. *F23R 3/08* (2013.01); *F23R 3/42* (2013.01); *F05D 2220/32* (2013.01); *F05D 2240/35* (2013.01); *F05D 2260/20* (2013.01); *F23R 2900/00012* (2013.01)

(58) Field of Classification Search
CPC ...... F23R 3/44; F23R 3/54; F23R 3/60; F23R 2900/03041; F23R 2900/03044; F01D 9/023
See application file for complete search history.

(56) References Cited

U.S. PATENT DOCUMENTS

| | | | |
|---|---|---|---|
| 8,051,663 B2 | 11/2011 | Tuthill | |
| 8,245,514 B2 | 8/2012 | Tu et al. | |
| 8,499,566 B2* | 8/2013 | Lacy | F23R 3/005 60/752 |
| 2005/0144953 A1 | 7/2005 | Martling et al. | |
| 2005/0262845 A1* | 12/2005 | Martling | F01D 9/023 60/752 |
| 2009/0120096 A1 | 5/2009 | Tuthill | |
| 2009/0255267 A1 | 10/2009 | Chen et al. | |
| 2010/0077761 A1* | 4/2010 | Johnson | F23R 3/44 60/752 |
| 2010/0229564 A1* | 9/2010 | Chila | F23R 3/06 60/752 |
| 2011/0247339 A1* | 10/2011 | Chila | F23R 3/02 60/752 |
| 2013/0086915 A1 | 4/2013 | Cihlar et al. | |
| 2014/0053571 A1* | 2/2014 | Keener | F23R 3/10 60/782 |
| 2014/0338355 A1* | 11/2014 | Stewart | F23R 3/283 60/776 |

FOREIGN PATENT DOCUMENTS

| | | |
|---|---|---|
| JP | 2008284688 A | 10/1996 |
| JP | 2009-250242 A | 10/2009 |
| JP | 2011-226481 A | 11/2011 |
| KR | 10-2014-0012183 A | 1/2014 |

OTHER PUBLICATIONS

Extended European search report, Application No. 16174803.30-1602, dated Jan. 11, 2017.
International Search Report issued in corresponding Application No. PCT/KR2016/006410, dated Sep. 9, 2016, 3 pages.

* cited by examiner

COMBUSTION DUCT ASSEMBLY FOR GAS TURBINE

CROSS-REFERENCE TO RELATED APPLICATIONS

This application claims priority to Korean Application No. 10-2015-0085057, filed Jun. 16, 2015, the contents of which are incorporated herein in their entirety.

BACKGROUND

The present disclosure relates to a combustion duct assembly for a gas turbine, and more particularly, to a combustion duct assembly for a gas turbine which does not considerably deteriorate joint stiffness of a liner and a transition piece, has a simple structure and can increase cooling effect of the liner and the transition piece.

A gas turbine is a rotary type heat engine for operating a turbine using high pressure combustion gas. In general, the gas turbine includes a compressor, a burner and a turbine. When air compressed in the compressor is mixed with fuel and is burnt, expanding combustion gas of high temperature is generated, and the turbine is rotated using power of the combustion gas to obtain driving power.

In order to transfer the combustion gas of high temperature generated from the burner to the turbine, a duct structure which is called a combustion duct assembly is needed. The combustion duct assembly generally includes a liner adjacent to the burner and a transition piece connected with the liner.

Now, an embodiment of the combustion duct assembly will be described in more detail. The burner is arranged at the upstream side of the liner, and an annular spring seal which is curved outwardly convexly is attached to the outer face of the downstream side of the liner connected with the transition piece. Moreover, the transition piece has a double tube structure including: an inner wall which elastically gets in contact with the convex part of the spring seal attached to the downstream side of the liner; and an outer wall which surrounds the inner wall. Therefore, the liner and the transition piece are connected to each other by medium of elasticity of the spring seal.

However, because the combustion duct assembly is a path through which combustion gas of high temperature flows, it needs an appropriate cooling. For this, a housing of the gas turbine is filled with some of the air compressed in the compressor at high pressure and a plurality of through holes are formed in a sleeve which surrounds the outer wall of the transition piece and the liner, so that the compressed air cools the liner and the transition piece.

Furthermore, a slit is formed in nearly the entirety of the spring seal (hula seal) so that compressed air flows into the inner wall of the transition piece, and a part of the liner in which the spring seal is mounted has a double wall structure that there is a space between walls and compressed air also flows into the double wall structure so that the outer face of the liner hidden by the spring seal can be cooled.

However, because the long slit formed in the spring seal connects the liner and the transition piece with each other, it structurally deteriorates elasticity of the spring seal to remarkably decrease joint stiffness between the liner and the transition piece. Moreover, a part of the liner to which the spring seal is mounted has the hollow double wall structure causing several disadvantages in that the manufacturing process is complicated and it is difficult to obtain sufficient cooling effect of the liner.

BRIEF SUMMARY

Accordingly, the present disclosure has been made in view of the above-mentioned problems, and it is an object of the present disclosure to provide a combustion duct assembly for a gas turbine which does not considerably deteriorate joint stiffness of a liner and a transition piece, has a simple structure and can increase cooling effect of the liner and the transition piece.

In an example, there is provided a combustion duct assembly for a gas turbine including: a liner having a burner arranged at an upstream side and an annular spring seal which is outwardly convex and is attached on an outer face of a downstream side; and a transition piece which has a double tube structure including an inner wall which elastically gets in contact with the convex part of the spring seal attached to the downstream side of the liner and an outer wall which surrounds the inner wall, wherein just an end portion of the downstream side of the spring seal is fixed to the liner and a plurality of through holes are formed to a half of the upstream side from the point where the spring seal comes into contact with the inner wall, and wherein the liner has a plurality of vent holes formed in an inner area surrounded by the spring seal.

In an embodiment, the through holes are formed only in the inner face of the spring seal.

Moreover, in another embodiment, the through holes are formed to partially split an end portion of the upstream side of the spring seal.

Furthermore, the vent holes may be formed to be inclined toward the downstream side.

Additionally, an annular guide which may be located at the upstream side of the vent holes arranged at the uppermost side and mounted on the inner face of the liner 100.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION

Figure 1:
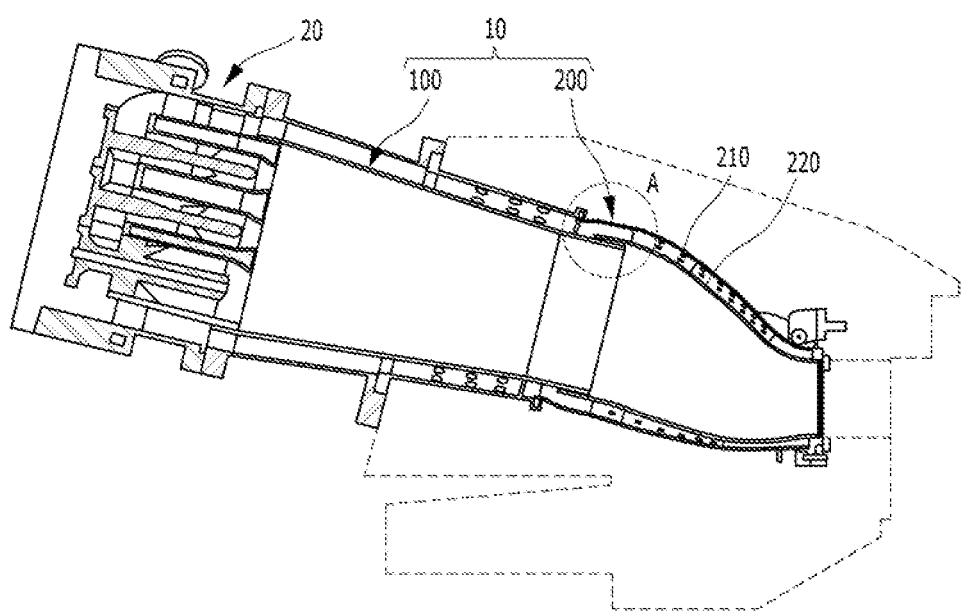
FIG. 1 is a cross-sectional view showing a structure of a combustion duct assembly for a gas turbine according to the present disclosure.

Reference will be now made in detail to the embodiments of the present disclosure with reference to the attached drawings. In addition, in the description of the present invention, when it is judged that detailed descriptions of known functions or structures related with the present invention which may make the essential points vague will be omitted. Additionally, the thicknesses of the lines or the sizes of the components shown in the drawing may be magnified for the clarity and convenience of the description.

Figure 2:
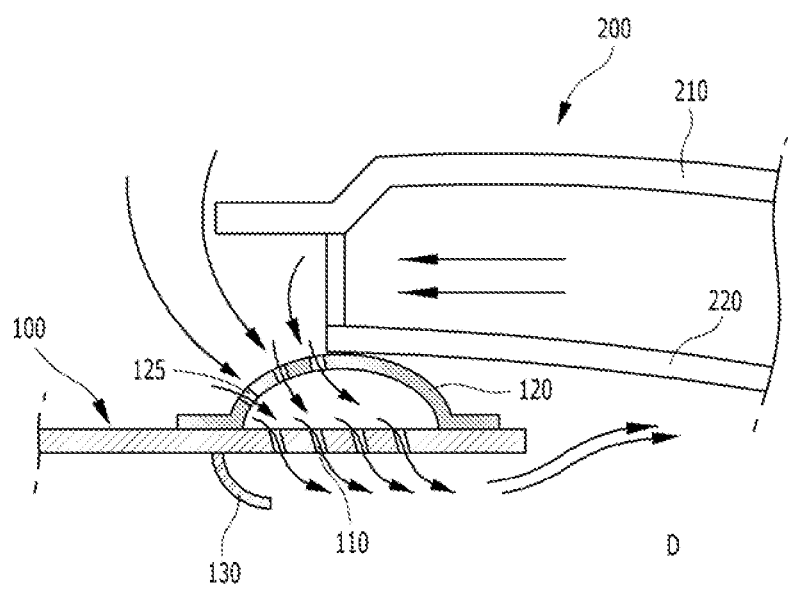
FIG. 2 is a partially enlarged view of an "A" part of FIG. 1.

FIG. 1 is a view showing a structure of a combustion duct assembly for a gas turbine according to the present disclosure, and FIG. 2 is a partially enlarged view of an "A" part of FIG. 1. Referring to the drawings, the combustion duct assembly 10 for the gas turbine according to the present disclosure will be described.

The combustion duct assembly 10 for the gas turbine according to the present disclosure includes a liner 100 and a transition piece 200 connected to the liner 100. The transition piece 200 is a duct structure to induce combustion gas of high pressure and high temperature made in a burner 20 to a turbine.

The burner 20 is arranged at an upstream side (U) of the liner 100 to make combustion gas by burning mixture in which air of high pressure supplied from a compressor and fuel are mixed. The transition piece 200 is connected to a downstream side (D) of the liner 100. An annular spring seal 120 is fixed on the outer face of the downstream side (D) of the liner 100.

Figure 3:
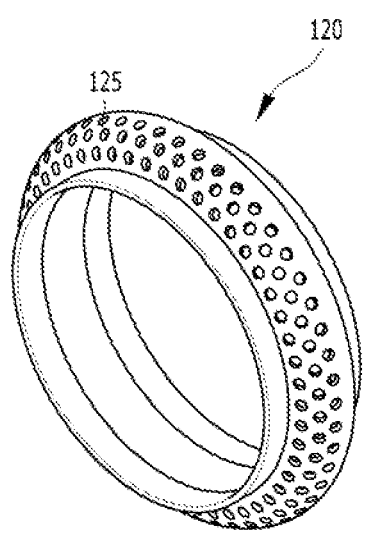
FIG. 3 is a perspective view of a spring seal according to an embodiment of the present disclosure.
Figure 4:
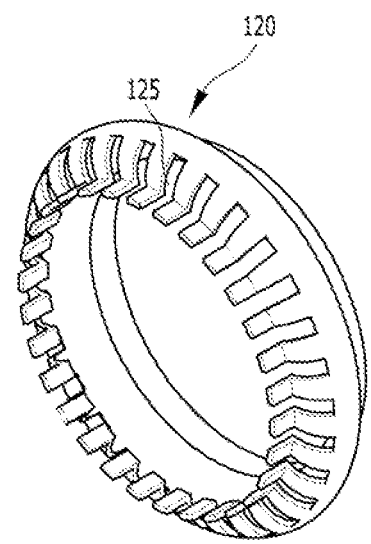
FIG. 4 is a perspective view of a spring seal according to another embodiment of the present disclosure.

Structures of the spring seal 120 are illustrated in FIGS. 3 and 4 in more detail. Except structures of through holes 125, the spring seals illustrated in FIGS. 3 and 4 are commonly formed into an "∩"-shaped annular spring which is outwardly convex, namely, whose cross section is convexly projected relative to the surface of the liner 100.

The spring seal 120 has flat surfaces extending from both sides thereof to be in wide contact with the liner 100. Just an end portion of the downstream side (D), out of both sides of the spring seal 120, is fixed to the liner 100 by welding.

The transition piece 200 has a double tube structure including: an inner wall 220; and an outer wall 210 which is spaced apart from the inner wall 220 at a predetermined interval and surrounds the inner wall 220. The convex part of the spring seal 120 of the liner 100 is connected with the transition piece 200 by a frictional force while elastically getting in contact with the inner wall 220 of the transition piece 200.

Here, just one of both sides of the spring seal 120 is fixed to the liner 100. That is, one of the both sides of the spring seal can be moved freely because the convex part of the spring seal 120 excessively deformed exceeding the limit of elasticity if both sides of the spring seal 120 are all fixed to the liner when the spring seal 120 is elastically deformed while being inserted into the inner wall 220 of the transition piece 200.

Particularly, just the end portion of the downstream side (D) of the spring seal 120 is fixed to the liner 100, and a plurality of the through hole 125 are formed only to a half of the upstream side from the point where the spring seal 120 comes into contact with the inner wall 220.

Because the housing of the gas turbine is filled with some of the air compressed in the compressor at high pressure and a plurality of the through holes are formed in the sleeve which surrounds the outer wall of the transition piece and the liner, the compressed air for cooling the liner 100 and the transition piece 200 reaches the outer face of the liner 100 and the inner wall 200 of the transition piece 200.

Therefore, because the half of the upstream side based on the point where the spring seal 120 comes into contact with the inner wall 220 is exposed to the compressed air, even though the through holes 125 are formed in the half area, there is no problem in cooling the liner 100.

Now, an elastic support structure of the spring seal 120 will be described. Because one of the both sides of the spring seal 120 is fixed to the liner 100, an area ranging from the fixed side of the spring seal 120 to the convex part which gets in contact with the inner wall 220 provides almost the whole elastic support, and the other half is just moved according to elastic deformation of the elastic support part. Therefore, even though the through hole 125 is formed in the half area which is not fixed to the liner 100, it structurally has low impact on the spring seal 120.

In consideration of the cooling characteristics through inflow of the compressed air and the characteristics of elastic support, the combustion duct assembly according to the present disclosure can achieve the two purposes of sufficient elastic support and cooling because just the end portion of the downstream side (D) of the spring seal 120 is fixed to the liner 100 and a plurality of the through hole 125 are formed only to the half of the upstream side from the point where the spring seal 120 comes into contact with the inner wall 220.

Furthermore, the compressed air induced through the through holes 125 formed in the half area of the spring seal 120 reaches the surface of the spring seal 120. In the present disclosure, a plurality of vent holes 110 are formed in the inner area of the liner 100 surrounded by the spring seal 120, so that the compressed air flows to the inner face of the liner 100 and the inner face of the inner wall 220 of the transition piece 200 connected to the liner 100.

That is, as shown in FIG. 2, the compressed air flows along the inner face of the liner 100 and the inner face of the inner wall 220 of the transition piece 200 connected with the liner 100 through the through holes 125 formed in the spring seal 120 and the vent holes 110 formed in the liner 100, so that thin air layers are formed on the inner face of the liner 100 and the inner face of the inner wall 220 of the transition piece 200 so as to realize film cooling effect. Because the film cooling prevents heat transfer of combustion gas more positively than that the inner face of the liner 100 and the inner face of the inner wall 220 of the transition piece 200 are simply cooled, the combustion duct assembly according to the present disclosure can obtain more excellent cooling effect.

FIGS. 3 and 4 illustrate the through holes 125 formed in the spring seal 120 according to preferred embodiments of the present disclosure. In FIG. 3, the through holes 125 are formed only in the inner face of the spring seal 120, but in FIG. 4, the through holes 125 partially split an end portion of the upstream side (U) of the spring seal 120.

In FIG. 4, the half area of the spring seal 120 which is not fixed to the liner 100 is split by the through holes 125. So, the split portions do nothing for elastic support because they can be freely bent or widened without any restriction. However, the through holes 125 of FIG. 4 can widen an area through which the compressed air passes and make the compressed air flow uniformly because they are formed into slits longer than the through holes 125 of FIG. 3. On the contrary, the spring seal 120 having the structure illustrated in FIG. 3 is structurally stronger than that illustrated in FIG. 4.

In the meantime, as shown in FIG. 2, the vent holes 110 formed in the liner 100 may be inclined downwardly toward the downstream side (D) so that the compressed air passing the vent holes 110 is induced toward the transition piece 200.

Additionally, an annular guide 130 which is located at the upstream side of the vent holes arranged at the uppermost side is mounted on the inner face of the liner 100 in order to more positively induce the compressed air toward the downstream side (D) without a back flow.

According to the combustion duct assembly for the gas turbine of the present disclosure, because just an end portion of the downstream side, out of both sides of the spring seal which elastically connects the liner and the transition piece with each other, is fixed to the liner and a plurality of the through holes are formed only to a half of the upstream side from the point where the spring seal comes into contact with the inner wall, the combustion duct assembly can secure sufficiently elastic support and provide film cooling effect to form thin air layers on the inner faces of the liner and the inner wall of the transition piece.

While the present disclosure has been particularly shown and described with reference to exemplary embodiments thereof, it will be understood by those of ordinary skill in the art that various changes in form and details may be made therein without departing from the spirit and scope of the present disclosure. Therefore, the technical scope of the present invention will be defined by the following claims and equivalences.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A combustion duct assembly for a gas turbine, comprising:
    a liner having an upstream side defined as towards a burner to which the liner couples and a downstream side opposite the upstream side, the burner configured to produce combustion gas flowing along an inner face of the liner that extends from the upstream side to the downstream side;
    a transition piece having an inner wall and an outer wall that surrounds the inner wall; and
    an annular spring seal that is coupled to an outer face of the downstream side of the liner and includes a convex part operable to elastically engage the inner wall of the transition piece and two opposite end portions each having a flat surface that extends from each of opposite sides of the convex part and lies flat on the outer face of the downstream side of the liner, the convex part including an upstream side, a downstream side, and an apex occurring between the upstream and downstream sides in an area where the annular spring seal comes into contact with the inner wall of the transition piece, the upstream side of the convex part having a plurality of through holes for introducing compressed air into an inner space of the annular spring seal that is arranged between the opposite sides of the convex part and is bounded by the convex part of the annular spring seal and the outer face of the downstream side of the liner,
    wherein the outer face of the downstream side of the liner includes an inner area that is surrounded by the annular spring seal, makes direct contact with the compressed air in the inner space of the annular spring seal, and includes a plurality of vent holes each communicating at one end with the inner space of the annular spring seal and at the other end with the inner face of the liner, and
    wherein the flat surface of the upstream side of the convex part includes a first continuous surface extending completely around an inner circumference of the annular spring seal, and the flat surface of the downstream side of the convex part includes a second continuous surface extending completely around the inner circumference of the annular spring seal, and wherein the plurality of through holes are circular in shape and formed only in the upstream side of the convex part of the annular spring seal.

2. The combustion duct assembly according to claim 1, wherein the plurality of vent holes are formed to be inclined toward the downstream side of the liner.

3. The combustion duct assembly according to claim 1, further comprising an annular guide configured to protrude from the inner face of the liner and disposed at an upstream side of the plurality of vent holes to block the combustion gas flowing along the inner face of the liner and to more positively induce the compressed air toward the downstream side of the liner,
    wherein the plurality of vent holes include vent holes disposed downstream of a distal end of the annular guide.

4. The combustion duct assembly according to claim 3, wherein the annular guide is curved toward a downstream direction to direct the compressed air in the downstream direction.

5. The combustion duct assembly according to claim 1, wherein one of the two opposite end portions of the annular spring seal is fixed to the outer face of the downstream side of the liner, and the other of the two opposite end portions of the annular spring seal is free to move with respect to the liner.

6. The combustion duct assembly according to claim 1, wherein the transition piece has a double tube structure.

7. A gas turbine, comprising:
    a burner; and
    a combustion duct assembly operable to couple to the burner, the combustion duct assembly including:
    a liner having an upstream side defined as towards the burner to which the liner couples and a downstream side opposite the upstream side, the burner configured to produce combustion gas flowing along an inner face of the liner that extends from the upstream side to the downstream side;
    a transition piece having an inner wall and an outer wall that surrounds the inner wall; and
    an annular spring seal that is coupled to an outer face of the downstream side of the liner and includes a convex part operable to elastically engage the inner wall of the transition piece and two opposite end portions each having a flat surface and that extends from each of opposite sides of the convex part and lies flat on the outer face of the downstream side of the liner, the convex part including an upstream side, a downstream side, and an apex occurring between the upstream and downstream sides in an area where the annular spring seal comes into contact with the inner wall of the transition piece, the upstream side of the convex part having a plurality of through holes for introducing compressed air into an inner space of the annular spring seal that is arranged between the opposite sides of the convex part and is bounded by the convex part of the annular spring seal and the outer face of the downstream side of the liner, wherein the outer face of the downstream side of the liner includes an inner area that is surrounded by the annular spring seal, makes direct contact with the compressed air in the inner space of the annular spring seal, and includes a plurality of vent holes each communicating at one end with the inner space of the annular spring seal and at the other end with the inner face of the liner, and wherein the flat surface of the upstream side of the convex part includes a first continuous surface extending completely around an inner circumference of the annular spring seal, and the flat surface of the downstream side of the convex part includes a second continuous surface extending completely around the inner circumference of the annular spring seal, and wherein the plurality of through holes are circular in shape and formed only in the upstream side of the convex part of the annular spring seal.

8. The gas turbine according to claim 7, wherein the plurality of vent holes are formed to be inclined toward the downstream side of the liner.

9. The gas turbine according to claim 7, further comprising an annular guide configured to protrude from the inner face of the liner and disposed at an upstream side of the plurality of vent holes to block the combustion gas flowing along the inner face of the liner and to more positively induce the compressed air toward the downstream side of the liner, wherein the plurality of vent holes include vent holes disposed downstream of a distal end of the annular guide.

10. The gas turbine according to claim 9, wherein the annular guide is curved toward a downstream direction to direct the compressed air in the downstream direction.

11. The gas turbine according to claim 7, wherein one of the two opposite end portions of the annular spring seal is fixed to the outer face of the downstream side of the liner, and the other of the two opposite end portions of the annular spring seal is free to move with respect to the liner.

12. The gas turbine according to claim 7, wherein the transition piece has a double tube structure.

13. The combustion duct assembly according to claim 1, wherein each of the plurality of through holes communicates indirectly with a combustion space that is formed by the inner face of the liner and is configured to contain the combustion gas produced by the burner, and wherein the compressed air introduced into the inner space of the annular spring seal via the plurality of through holes flows into the inner space of the annular spring seal and then through the plurality of vent holes from the inner space of the annular spring seal to the inner face of the liner.

14. A combustion duct assembly for a gas turbine, comprising:
a liner having an upstream side defined as towards a burner to which the liner couples and a downstream side opposite the upstream side, the burner configured to produce combustion gas flowing along an inner face of the liner that extends from the upstream side to the downstream side;
a transition piece having an inner wall and an outer wall that surrounds the inner wall; and
an annular spring seal that is coupled to an outer face of the downstream side of the liner and includes a convex part that is operable to elastically engage the inner wall of the transition piece and first and second flat surfaces that respectively extend from an end of each of opposite sides of the convex part and face the outer face of the downstream side of the liner, the convex part including an upstream side, a downstream side, and an apex occurring between the upstream and downstream sides in an area where the annular spring seal comes into contact with the inner wall of the transition piece and not overlapping either of the upstream side or the downstream side,
wherein the upstream side of the convex part has a plurality of partially split through holes for introducing compressed air into an inner space of the annular spring seal that is bounded by the convex part of the annular spring seal and the outer face of the downstream side of the liner, and
wherein the first flat surface extends from the downstream side of the convex part and is fixed to the outer face of the downstream side of the liner and the second flat surface extends from the upstream side of the convex part, and the plurality of partially split through holes are open only in the upstream side of the convex part and are not open in the downstream side of the convex part.

15. The combustion duct assembly according to claim 14, wherein the outer face of the downstream side of the liner includes an inner area that is surrounded by the annular spring seal, makes direct contact with the compressed air in the inner space of the annular spring seal, and includes a plurality of vent holes each communicating at one end with the inner space of the annular spring seal and at the other end with the inner face of the liner.

16. The combustion duct assembly according to claim 14, wherein the plurality of partially split through holes extend from an end portion of the second flat surface of the upstream side of the convex part toward the apex of the convex part, and
wherein each of the plurality of partially split through holes has a first end and a second end extending from the first end so as to be disposed opposite to the first end in a lengthwise direction of the partially split through hole, and the first and second ends are both disposed on the upstream side of the convex part.

17. The combustion duct assembly according to claim 14, wherein the first and second flat surfaces respectively extend from the end of each of the opposite sides of the convex part, each of the first and second flat surfaces including an annularly inner edge that lies flat on the outer face of the downstream side of the liner and an annularly outer edge that lies flat on the outer face of the downstream side of the liner, and
wherein the second flat surface of the upstream side of the convex part consists of a plurality of flat surfaces arranged around an inner circumference of the annular spring seal.

18. The combustion duct assembly according to claim 14, wherein the convex part of the annular spring seal includes a half area on the downstream side of the convex part and a half area on the upstream side of the convex part, and wherein the plurality of partially split through holes are formed only in the half area on the upstream side.

* * * * *